J. B. WATSON.
BEARING.
APPLICATION FILED OCT. 9, 1918.
1,327,301.
Patented Jan. 6, 1920.
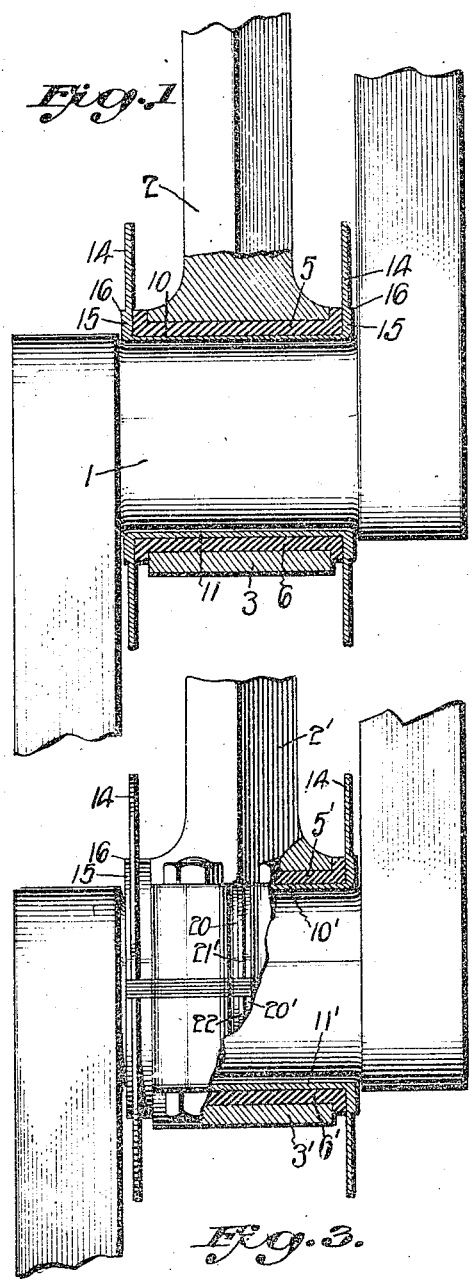
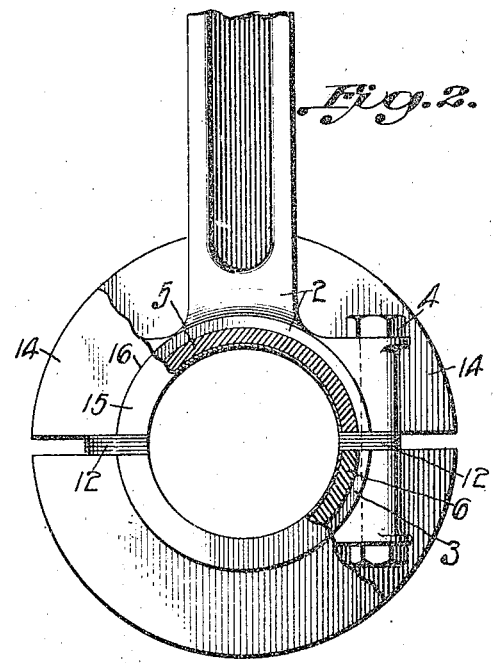
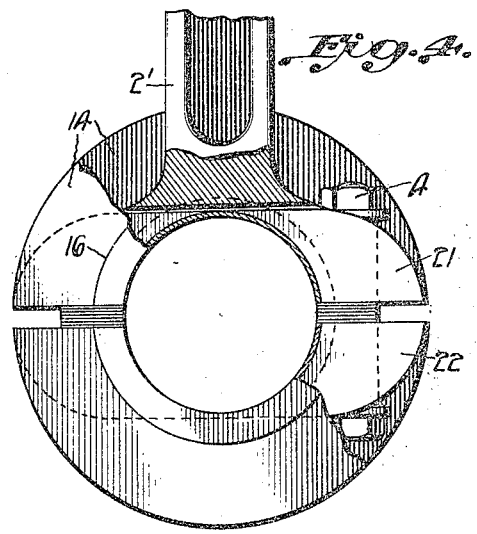
Inventor
James B. Watson,
By Pagelsen & Spencer, Attorneys

UNITED STATES PATENT OFFICE.

JAMES B. WATSON, OF DETROIT, MICHIGAN.

BEARING.

1,327,301.  Specification of Letters Patent.  Patented Jan. 6, 1920.

Application filed October 9, 1918. Serial No 257,512.

*To all whom it may concern:*

Be it known that I, JAMES B. WATSON, a citizen of the United States, and residing at Detroit, in the county of Wayne and State of Michigan, have invented a new and Improved Bearing, of which the following is a specification.

As is well known to those skilled in the art, very great difficulty is experienced in preventing the burning out of plain bearings for high speed heavy duty machine parts such, for example, as those for the connecting rods and main bearings of tractor engines; and even in those instances in which the bearings are not actually burned out they are very liable to become overheated, thereby not only causing the lubricating oil to deteriorate but also setting up destructive effects in the bearings themselves.

The problem will perhaps be best understood by remembering that the shaft and the bearing are ordinarily formed of metals having different co-efficients of expansion, from which it follows that a bearing that accurately fits a shaft at 70 degrees F., say, will tend to grip it or approach a line contact at other temperatures. Again, the bearing surfaces when examined microscopically present minute projections, and the departure from the true form increases with the increase in temperature, thus limiting the contact more nearly to spots and tending to further generate heat, the process being cumulative once the temperature increases materially from that at which the bearing was fitted. This action not only affects the metal of the bearing and of the shaft but sets up rapid deterioration in the oil: the adhesion of even fresh oil films to the metal is also greatly reduced at the higher temperature and the metal surfaces in effect ride directly on each other, causing abrasion and quick destruction.

Efforts to prolong the life of bearings have generally followed one or both of two lines; first, the use of special oiling systems of the pressure type and, second, the betterment of the material of which the bearing is formed. These and other practices having proven insufficient to meet the conditions encountered in heavy duty service, such as in the connecting rods of internal combustion engines which necessarily run continuously at substantially full load for considerable periods, the solution of the problem has resolved itself in practice into a repeated renewal of parts, which is, of course, most expensive and annoying. Moreover, alloys that have a relatively high melting point as, for instance, those wherein tin is the predominating element, are usually not only expensive but also hard and therefore relatively difficult to finish.

Generally, the babbitt or other bearing metal has been formed in a block and mounted in the connecting rod or other machine element with which the bearing is associated, the parts being separated by a seam or joint which quickly becomes filled with a film of oil whereby an effective heat insulation is formed. It is also customary to cast the bearing metal directly in the associated main member, but this practice often causes the parts to be thrown away when worn, and, in any event, interferes with the ready replacement of the bearing. Again, in so casting the bearing metal in the associated element, pockets are often formed along the joint, and these pockets soon fill with oil and locally heat insulate the bearing, with the final result that the bearing is likely to become distorted and fail for obvious reasons.

In accordance with the present invention, I avoid the destructive effects due to heat by maintaining the bearing metal at all times at a temperature below that at which such effects take place; this I accomplish by providing the bearing itself with projecting fins or radiating surfaces of area sufficient to insure a constant radiation of the excess heat into the surrounding atmosphere. Both the shape and location of these fins are subject to considerable variation, but I prefer to place them at the extreme ends.

In the drawings, Figure 1 is a longitudinal section showing a preferred embodiment of the invention. Fig. 2 is a side view corresponding to Fig. 1, the shaft being omitted and parts being broken away. Figs. 3 and 4 are views corresponding, respectively, to Fig. 1 and Fig. 2 and showing a modification.

1 indicates a shaft which may be either the crank shaft of an internal combustion engine, as shown, or any other shaft; likewise, 2 indicates a main member which may be the connecting rod or any other desired element, either movable or fixed, with respect to which the shaft may have relative angular movement. As shown, the main member includes a cap 3 secured in place by bolts 4, and both the main portion of the main member and the cap are provided with backings 5—6 of bronze or the like for supporting a bearing, hereinafter described, but these backings might be omitted. The shaft may and usually does rotate, but it might be stationary in which case the element 2 alone would have angular movement. In other words, the particular shaft and main member shown are selected only in that they constitute a good example, particularly when the engine is that of a tractor, of the heavy bearing service to which my invention has special application.

Interposed between the shaft and the member 2 is a plain bearing of babbitt or other suitable metal and preferably formed in two parts 10—11 corresponding to the body of the member 2 and to the cap. If desired, shims 12 may be employed for purposes of adjustment. The bearing metal is turned outwardly at the ends in the form of flanges or fins 14 the bases of which are preferably thickened at 15, said thickened portions preferably merging into the thinner portions abruptly, particularly when the bearing itself is movable, to form an edge 16 whereby oil is flung off by centrifugal action, or caused to drip, if the bearing is stationary. This construction also takes the end thrusts properly, and insures clearance, relatively to the connecting rod or the like, for the main portions of the fins. The size of the flanges may vary considerably in the different installations and will naturally be smaller for like service where the bearing is movable than when it is stationary; however, they will, in any event, project considerably beyond the adjacent surface of the member 2 to provide heat radiating area preferably as large or larger than that of the surface in which the bearing contacts with the shaft.

In this manner the heat generated between the bearing and the shaft is rapidly conducted, through the metal of the bearing itself, into the heat radiating flanges and is not forced to accumulate in the bearing proper or pass across the oil insulated joint or joints encountered before it could be taken up by the main member. The transmission and dissipation of excess heat from the bearing is thus direct and rapid and the destructive effects traceable to high temperatures are done away with by reason of the prevention of such temperature. This action is enhanced by the presence of the thickened portions at the base of the flanges inasmuch as they tend to extract the heat quickly from the intermediate zone and disseminate it more rapidly into the thinner outlying parts. The ribs or edges 16 in the connecting rod installation shown, tend to prevent oil from collecting on the surface of the flanges and thereby insure more rapid radiation.

Somewhat the same result may be secured by making the flanges separate from the bearing proper and by soldering or otherwise fastening them thereto by a jointless connection, but the integral construction is cheaper and more efficient.

It is possible, in those cases wherein a larger radiating area is desired, to divide or slot the connecting rod or other main member 2' and the cap 3' as shown at 20, and 20', respectively, (it being understood that the backings 5' and 6', if used, are similarly slotted) Fig. 3, and to provide the intermediate portion of the bearing elements 10'—11' with flanges or lobes 21—22 that project outwardly through said slots; and the end flanges might even be omitted, reliance then being had wholly on the intermediate flange or flanges. Various other changes in the details of construction will occur to those skilled in the art, and I do not therefore, wish to be limited except as indicated by the subjoined claims.

It will be understood that by properly calculating or otherwise ascertaining the size of the flanges the bearing may be made to operate at a predetermined desirable temperature such as will secure maximum efficiency of the oil; in the normal operation of the bearing, the temperature will build up to the desired point, the fins thereafter serving to radiate excess heat.

I claim:—

1. In a bearing construction, a main member, a plain bearing of bearing metal carried thereby and including a body portion having an inner surface conforming to and in bearing contact with a shaft, said bearing and shaft having relative angular movement, said bearing also including a thin fin-like element projecting considerably from the body portion and forming a radiating surface of an area at least equal to a large proportion of that of the inner surface of the body portion.

2. A plain bearing construction including a main member, a plain bearing of bearing metal of low heat resisting quality carried thereby and having an inner surface conforming to and in bearing contact with a shaft, said bearing and shaft having relative angular movement, said bearing being constructed and arranged to form free heat radiating area, independent of the surface of the main member and of a size at least approximating a large proportion of that of the inner surface of the bearing.

3. In combination with a main member and a shaft, a plain bearing of bearing metal interposed between the member and shaft and in rolling contact with the latter, said bearing having integral therewith a fin-like element projecting outwardly therefrom in a direction substantially radially of the shaft and considerably beyond the adjacent portion of the main member and forming a heat radiating surface of appreciable size, whereby heat generated in the bearing is dissipated into the atmosphere.

4. In combination with a main member and a shaft, a plain bearing of bearing metal interposed between the member and shaft and in rolling contact with the latter, said bearing having its end portions extending outwardly away from the axis of the shaft and considerably beyond those portions of the main member which are nearest said end portions of the bearing, whereby heat radiating surfaces of considerable size are formed at each end of the bearing.

5. In combination with a main member and a shaft, a longitudinally split plain bearing of bearing metal interposed between the member and shaft and in rolling contact with the latter, said bearing being approximately spool shaped, the flanges of the spool extending outwardly considerable distances and forming on both sides of said flanges heat radiating areas of considerable size spaced from the main member.

6. A bearing construction including a main member, a plain bearing of bearing metal carried thereby and having an inner surface adapted to conform to a shaft, said bearing including a thin fin or flange-like element forming free heat radiating surface of considerable size, the bearing being thicker transversely of the flange-like element near the base thereof than at points near its outer edge.

7. In combination with a shaft and a main member having angular movement about the shaft, a plain bearing interposed between the member and the shaft and including a flange extending outwardly beyond the adjacent portion of the main member to form heat radiating surface of considerable size, said flange including means for flinging off oil which may be passing outwardly thereon before it reaches the outer portion thereof.

8. A plain bearing comprising an element substantially the shape of a spool centrally split lengthwise, the end flanges of the element having ribs on their outer faces, said ribs being located near the base of the corresponding flange and being adapted to fling off oil when the bearing is rotated angularly about its axis.

9. In combination with a shaft and a main member, a plain bearing interposed between the member and the shaft and including a fin extending outwardly beyond the adjacent portion of the main member to form heat radiating surface of considerable size, said fin including means for causing oil to drip therefrom at a point considerably removed from its outer edge, whereby the outer portion of the fin is prevented from becoming heat-insulated by the oil.

10. In combination with a main member and a shaft, an interposed plain bearing of bearing metal carried thereby and having an inner surface engaging with the shaft, said bearing including thin fins or flange-like elements at its ends forming free heat radiating surfaces of considerable size, said elements being adapted to take end thrusts near their bases and having portions farther from the axis of the shaft offset toward the opposite element.

11. In a bearing construction, a main member, a plain bearing of bearing metal carried thereby and including a body portion having an inner surface conforming to and in bearing contact with a shaft and with a thrust portion at the end thereof, said bearing and said shaft having relative angular movement, said bearing also including a thin fin-like element projecting outwardly from the thrust portion and forming a radiating surface of an area at least equal to a large proportion of that of the inner surface of the body portion.

12. A bearing construction including a plain bearing of bearing metal, a rotatable shaft in rolling contact therewith, a support for said plain bearing, said bearing being separated from said support by a film of oil, said bearing also including thin fin-like means projecting therefrom and forming heat radiating surface of area sufficient to normally maintain the temperature of said bearing metal below that at which it might become injured by service.

13. In combination with a main member and a shaft rotatable in respect thereto, an interchangeable plain bearing of bearing metal interposed between said main member and said shaft, said shaft being in rolling contact with said bearing, said bearing being constructed and arranged to form free heat radiating area of a size sufficient to normally maintain the temperature of said bearing metal below that at which it might become injured by service.

14. A heavy duty bearing construction for internal combustion engines, comprising a main member including a backing, a rotatable shaft, a plain bearing of metal having a low melting point interposed between said backing and the shaft and affording with said backing a seam which tends to heat insulate the bearing from the backing, said shaft being in rolling contact with the bearing metal, said bearing including thin fin-like means projecting therefrom and forming heat radiating surface sufficient to normally maintain the temperature of said bearing metal below that at which rapid destruction would take place in service.

JAMES B. WATSON.